United States Patent
McLean et al.

(10) Patent No.: US 9,136,786 B2
(45) Date of Patent: Sep. 15, 2015

(54) MEASUREMENT CIRCUIT

(75) Inventors: Andrew Fitzroy McLean, Warley (GB); Maciej Kudanowski, Solihull (GB)

(73) Assignee: TRW Limited, West Midlands (GB)

( * ) Notice: Subject to any disclaimer, the term of this patent is extended or adjusted under 35 U.S.C. 154(b) by 110 days.

(21) Appl. No.: 13/817,652

(22) PCT Filed: Aug. 16, 2011

(86) PCT No.: PCT/GB2011/051544
§ 371 (c)(1),
(2), (4) Date: Jul. 2, 2013

(87) PCT Pub. No.: WO2012/022970
PCT Pub. Date: Feb. 23, 2012

(65) Prior Publication Data
US 2013/0293171 A1  Nov. 7, 2013

(30) Foreign Application Priority Data
Aug. 20, 2010  (GB) .................................. 1013957.4

(51) Int. Cl.
*H02P 6/18* (2006.01)
*H02P 6/10* (2006.01)
*H02P 29/02* (2006.01)
(Continued)

(52) U.S. Cl.
CPC .. *H02P 6/18* (2013.01); *H02P 6/10* (2013.01); *H02P 6/186* (2013.01); *H02P 25/026* (2013.01); *H02P 29/021* (2013.01); *H02M 7/53875* (2013.01); *H02M 2001/0009* (2013.01);
(Continued)

(58) Field of Classification Search
CPC ........................................................ H02P 6/18
USPC ................................ 318/400.32, 400.01, 700
See application file for complete search history.

(56) References Cited

U.S. PATENT DOCUMENTS 5,815,391 A * 9/1998 Pelly ............................... 363/98
6,300,701 B1 * 10/2001 Ong et al. ..................... 310/179
(Continued)

FOREIGN PATENT DOCUMENTS

EP  0115733 A1  8/1984
EP  1890369 A1  2/2008
(Continued)

OTHER PUBLICATIONS

Qiang Gao, Greg M. Asher, Fellow, IEEE, Mark Sumner, Senior Member, IEEE, and Pavol Makys: "Position Estimation of AC Machines Over a Wide Frequency Range Based on Space Vector PWM Excitation"; pp. 10001-1011; IEEE Transactions on Industry Applications, vol. 43, No. 4, Jul./Aug. 2007.

Peter Nussbaumer, Thomas M. Wolbank, Member, IEEE; "Saliency Tracking based Sensorless Control of AC Machines Exploiting Inverter Switching Transients"; pp. 114-119; 978-1-4244-7036-5/10/ $26.00 @2010 IEEE.
(Continued)

*Primary Examiner* — David S Luo
(74) *Attorney, Agent, or Firm* — MacMillan, Sobanski & Todd, LLC (57) ABSTRACT

A measurement circuit in a motor circuit generates signals for use in a motor control strategy for an electric motor. The measurement circuit comprises a first current sensing means which produces an output signal indicative of the current flowing in a di/dt path connecting the phases of the motor to a ground or a common positive supply voltage, and further comprises a second current sensing means which produces an output signal indicative of the rate of change of current flowing in the ground line, and in which the second current sensing means comprises a Rogowski coil.

15 Claims, 5 Drawing Sheets

(51) Int. Cl.
*H02P 25/02* (2006.01)
*H02P 6/04* (2006.01)
*H02M 7/5387* (2007.01)
*H02M 1/00* (2007.01)

(52) U.S. Cl.
CPC ....... *H02P2006/045* (2013.01); *H02P 2203/01* (2013.01); *H02P 2207/05* (2013.01)

(56) References Cited

U.S. PATENT DOCUMENTS 7,719,285 B2    5/2010  Johansson et al.
8,183,803 B2 *  5/2012  Li et al. .................. 318/400.01

FOREIGN PATENT DOCUMENTS

| | | |
|---|---|---|
| JP | 2001066329 A | 3/2001 |
| JP | 2001-165965 | 6/2001 |
| JP | 2008005636 A | 1/2008 |
| JP | 2009213219 A | 9/2009 |
| KR | 20090107863 A | 10/2009 |

(56) References Cited

OTHER PUBLICATIONS

Manfred Schroedl, Member, IEEE, Institute of Electrical Machines and Drives, Vienna University of Technology, Vienna, Austria; "Sensorless Control of AC Machines at Low Speed and Standstill Based on the 'INFORM' Method"; pp. 270-277; 0-7803-3544-9/96 $5.00 @ 1996 IEEE.

Takaharu Takeshita, Yoshiki Nagatoshi, and Nobuyuki Matsui, Dept. of Electrical and Computer Engineering, Nagoya Institute of Technology; "Sensorless Vector Control of Induction Motor at Zero Frequency"; pp. 510-515; 0-7803-7156-9/02/$10.00@2002IEEE.

Search Report under Sections 17(5) and 17 from Intellectual Property Office, South Wales, for Application No. GB1013957.4 dated Dec. 20, 2010.

International Search Report for Application No. PCT/GB2011/051544 dated Feb. 8, 2013.

International Preliminary Report on Patentability for Application No. PCT/GB2011/051544 dated Mar. 5, 2013.

Japanese Office Action, dated Nov. 25, 2014.

\* cited by examiner

MEASUREMENT CIRCUIT

CROSS-REFERENCE TO RELATED APPLICATIONS

This application is a national stage of International Application No. PCT/GB2011/051544 filed Aug. 16, 2011, which claimed priority to Great Britain Patent Application No. GB 1013957.4 filed Aug. 20, 2010, the disclosures of which are incorporated herein by reference in entirety.

BACKGROUND OF THE INVENTION

This invention relates to a measuring apparatus for use with an electric motor, and to a drive apparatus for an electric motor which uses a measuring apparatus in determining the angular position of the electric motor. It has particular application in an electric power steering system.

Electric motors have found application in a wide range of situations. One particular area in which they have found use in the last two decades is electric power steering systems. In such a system, an electric motor is used to provide an assistance torque for the driver. The motor is connected to the steering system and applies a torque that is dependent on the torque applied to the steering system by the driver. This is typically measured using a torque sensor connected to the steering column.

In order to control the motor, it is often required to know the position of the motor. This measurement can also be used in a steering system to determine the position of the steering column and hence the angle of the roadwheels and steering wheel. Provided that there is a fixed relationship between the motor angle and the steering wheel then knowledge of the position of one allows the position of the other to be calculated. This measurement is usually performed using an angular position sensor.

It has been appreciated that it would be advantageous to be able to measure motor position without providing a separate position sensor. This would allow sensorless control and potentially reduce both costs and complexity of the system.

WO/2004/023639 discloses a drive system for a three phase brushless motor that uses an algorithm for position sensing which measures the inductance in the motor phases and determines the position from the measured inductances. In order to reduce acoustic noise, the inductances are measured during test periods which are conducting states added to the PWM pattern in each PWM period. The test periods have net voltage of zero and therefore do not affect the output of the motor, but are sufficiently long to allow inductance measuring as well as the use of a single current sensor for current sensing.

A simple position measuring circuit for an electro-hydraulic power steering system is suggested in WO2004/023639 involving a differential amplifier 610 connected directly across a shunt resistor 620 in a ground line to measure the rate of change of current di/dt in a phase and from this determine the phase inductance and then position. The amplifier will amplify the voltage dropped across the resistor and must have a high dynamic range to accommodate the large change in voltage at the start of a test pulse as well as the small changes in voltage within a test pulse. The need for the high precision amplifier high dynamic range amplifier increases costs which the applicant now realises is undesirable. This can be seen in FIG. 1 of the accompanying drawings. In applicants later application WO2008/139718, and corresponding U.S. Pat. No. 8,240,281 B2, both of which are incorporated by reference herein in entirety, a sample and hold circuit is used to remove the DC offset, but such a solution is also necessarily complex.

BRIEF SUMMARY OF THE INVENTION

According to a first aspect there is provided a measurement circuit in a motor circuit arranged to generate signals for use in a motor control strategy for an electric motor, the measurement circuit comprising: a first current sensing means which produces an output signal indicative of the current flowing in a di/dt path connecting the phases of the motor to a ground or a common positive supply, and characterised by further comprising:

a second current sensing means which produces an output signal indicative of the rate of change of current flowing in the ground line, and in which the second current sensing means comprises a Rogowski coil.

The applicant has appreciated that the problems present in the prior art can be ameliorated by using both a first current sensing means and a Rogowski coil together in a di/dt path (the common line connecting all the phases to a ground or positive common supply) to provide the required current and rate of change information. Heretofore all attempts at deriving this information have been through use of a single sensing device or through the use of current shunt resistors. Having appreciated that two devices can be used the applicant has appreciated that a resulting simplification of the processing circuitry required is possible if one of those is a Rogowski coil making the use of two sensors an economically viable solution.

By providing a Rogowski coil a simple direct measurement of the rate of change of current can be obtained without the need for complex processing of the signal from the first sensing means. Because the output of the Rogowski coil then does not need to be integrated to get the current measurement as this is obtained from the first current sensing means it can be optimised so that a large swing in output is achieved over the expected range of rate of change values.

The output of the first current sensing means and the second sensing means may be fed to respective inputs of a motor control circuit.

The first current sensing means may comprise a current shunt resistor connected in series in the ground line and a circuit which produces and outputs signal indicative of the voltage dropped across the shunt resistor.

The first and second current sensing means may be arranged in series in the ground path.

An integrator may be provided which integrates the output signal from the Rogowski coil to provide a further signal indicative of the current flowing in the ground line. A comparison means may be provided for comparing this with an AC current measurement from the first sensing means and a means may be provided for flagging an error in the event that they differ by a significant amount. Thus the output of the coil can be used to check the integrity of the output of the first sensing means. This is especially convenient when the first and second sensing means are in series with each other.

The Rogowski coil may comprise a helical coil of conductive wire that encircles the path, with one end of the coil being looped back through the centre of the coil to the other end, the output of the coil being the voltage measured across the two ends of the coil. Of course it may have other forms. For example, the coil may be wound onto a former that surrounds the path, or may be laid out as tracks on a printed circuit board (PCB).

The output voltage Vout of a Rogowski coil is described by the formula:

$$V_{out} = AN di/dt$$

Where A is a constant dependent on the size and shape of the coils and whether they are in free space, N is the number of turns, and di/dt is the rate of change of the current in the ground line which passes through the coil. The coil may, for example, have 250 to 100 turns on an air cored toroidal former. The former may have a single piece or split cored, with a view to providing full scale output voltage over complete motor revolution of substantially 50 mVolts.

According to a second aspect the invention provides a Rogowski coil located in a ground line of a multi phase electric motor which provides an output signal indicative of the rate of change of current in the ground line during use of the motor, the output signal being fed to a motor controller.

The motor controller may be adapted to estimate the inductance of the motor from the output signal from the Rogowski coil and in turn estimate the position of the motor from the estimate of the inductance.

The invention can be used with a wide variety of motor control strategies, although it is particularly advantageous when used to control a motor according to the teachings of WO/2004/023639 which is incorporated herein by reference. The control strategy may therefore form part of a drive system for a three phase brushless motor which uses an algorithm for position sensing which measures the inductance in the motor phases and determines the position from the measured inductances. In order to reduce acoustic noise, the inductances may be measured during test period, which are conducting states added to the PWM pattern in each PWM period. The test periods have net voltage of zero and therefore do not affect the output of the motor, but are sufficiently long to allow inductance measuring as well measurements from a common ground line to be obtained.

Other advantages of this invention will become apparent to those skilled in the art from the following detailed description of the preferred embodiments, when read in light of the accompanying drawings.

DETAILED DESCRIPTION OF THE INVENTION

The present invention can be used with motors in a wide variety of applications but an example of a motor used in a steering system is described hereinafter. A steering system comprises a steering rack arranged to move left and right to control the angle of the front wheels of a vehicle. The rack is connected through a steering shaft to a steering wheel which can be turned by a driver to in turn cause the rack to move. To assist the driver in turning the wheel an electric motor is connected to the shaft (or rack) through a gearbox. This is commonly referred to as an electric power assisted system. In an alternative the power assistance may be provided hydraulically by connecting a two-sided piston in a hydraulic circuit and movable cylinder to the rack in a known manner. Hydraulic fluid is pumped around the hydraulic circuit in a known manner using a pump driven by a motor. So again the motor is the primary motive source for the assistance. This is known as an electro-hydraulic power assisted steering system.

Figure 3:
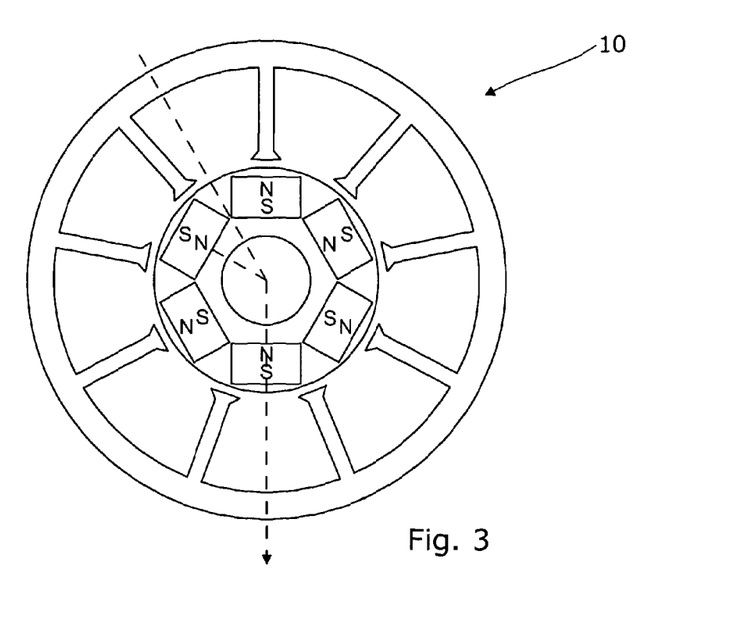
FIG. 3 is a view of the motor showing the motor poles.

Referring to FIG. 3, the motor comprises a three phase electrically commutated sinusoidal AC brushless permanent magnet synchronous motor which comprises a rotor having, for example, six magnets mounted on it, which in this instance are arranged to provide six poles which alternate between north and south around the motor. A stator, in this example, comprises a nine slot copper wound element having three groups of three teeth, each group of teeth having a common winding forming a respective phase. The motor therefore passes through three complete electrical cycles on each full rotation of the rotor.

Figure 1:
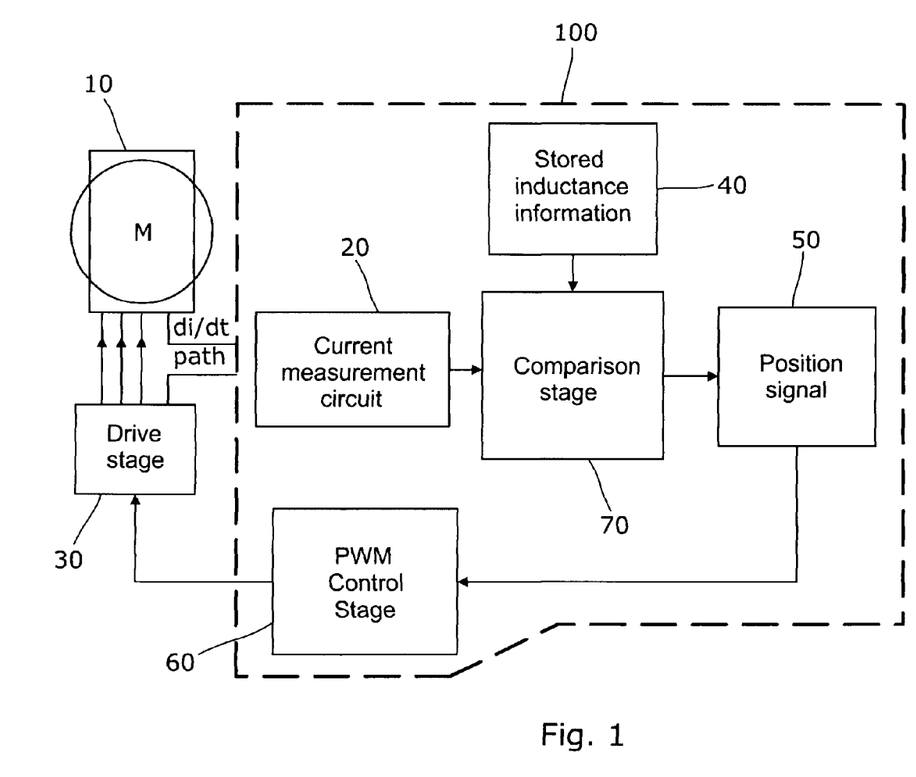
FIG. 1 is a general schematic of an electric motor and its associated drive and control circuitry which includes a current measurement circuit in accordance with the present invention.

The motor 10 is controlled by a control unit 100 which is in two parts—a first part that determines the motor position and a second part that generates appropriate PWM signals for the motor. The relationship between the motor and the various circuit components associated with it is illustrated in FIG. 1 of the drawings.

The control unit 100 receives an input signal from a vehicle speed sensor (not shown) which varies with vehicle speed, and a signal from a steering rate sensor which varies with the steering rate. It may also or alternatively receive an input signal that varies with the torque demanded by the driver, which may be obtained from a torque sensor associated with the steering shaft. For the hydraulic system the speed of the motor generally is arranged to increase with steering rate and decrease with vehicle speed. In the case where the motor is directly connected to the steering column or rack without hydraulics the control unit controls the torque output by the motor rather than its speed.

Figure 2:
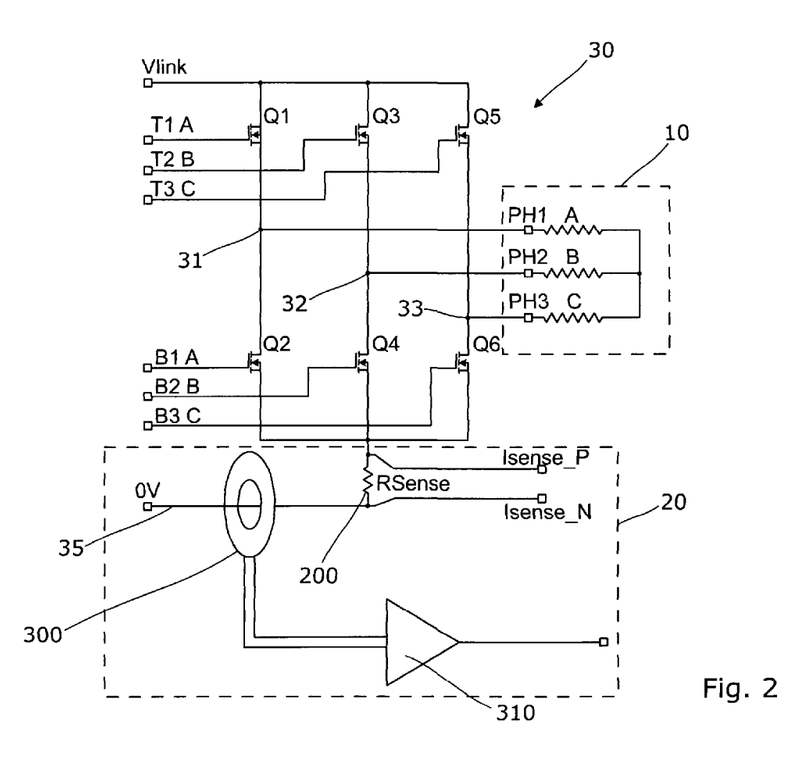
FIG. 2 is a more detailed schematic of the motor control and drive circuit for the motor of FIG. 1.

The motor drive circuit 30 is shown in more detail in FIG. 2 of the accompanying drawings. The three motor windings generally designated A, B and C is connected in a star network. A delta network could be used. One end of each phase winding is connected to a respective terminal 31, 32, 33 and the other ends of the three windings are connected together to form a star centre point. A drive circuit 30 is provided which comprises a three phase bridge. Each phase of the bridge comprises a top arm including a top switching transistor (Q1, Q3, Q5), and a bottom arm including a bottom switching transistor (Q2, Q4, Q6). The top and bottom arms are connected at the one end of the respective phase windings, the other ends of each top arm being connected together to a supply rail, typically of 12 volts. The other ends of the bottom arms are connected together to a ground line that is connected to ground. Thus, each phase of the bridge comprises a top and bottom switch with the phase winding being tapped off between the two switches.

The switches are turned on and off in a controlled pattern by the drive circuit according to signals provided from a PWM control stage 60 to provide pulse width modulation (PWM) of the potential difference applied to each of the windings and hence the current flowing through the motor. This in turn controls the strength and orientation of the magnetic field and hence the torque and speed of the motor. At switch on of each phase, indeed on each change in PWM state, the current rises rapidly in the DC link (the di/dt path through which the current flowing at any time has a value equal to the sum of all currents flowing through the motor) according to the algebraic sum of the three phase currents for that given PWM configuration. In reality small changes in the DC level will occur due to changes in phase inductance as the motor rotates.

Optionally, within the PWM pattern a test pulse may be applied to the motor. The purpose of this test pulse is to provide a period of time in which a known current flows in one phase of the motor (with no current applied to the others). This can then be measured, or more correctly the rate of change of that current can be measured, for use in determining the motor position. This test pulse should be kept as short as possible allowing many such short test pulses to be applied within a single motor revolution. In reality no actual test pulse need be applied—the system simply is configured to perform the tests during appropriate windows times when the PWM pattern corresponds with the pattern that is needed for a test pulse, the PWM strategy being chosen so that these test windows occur inherently as part of the PWM strategy.

The control unit needs to know the motor position to ensure that the correct PWM pattern is produced by the PWM control stage 60. This could be determined from a position sensor associated with the motor but in this example is determined by estimating the inductance of the motor at any given time. Because this will vary with motor position it can be used to give an estimate of position without the need to provide a position sensor. In particular in this example the inductance measurement is obtained by determining the rate of change of the current flowing in the ground line. This method of control is taught in, for example, WO 2004/023639 for an electro-hydraulic (EPHS) system but the invention is equally applicable to fully electric (EPAS) systems as well.

Figure 4:
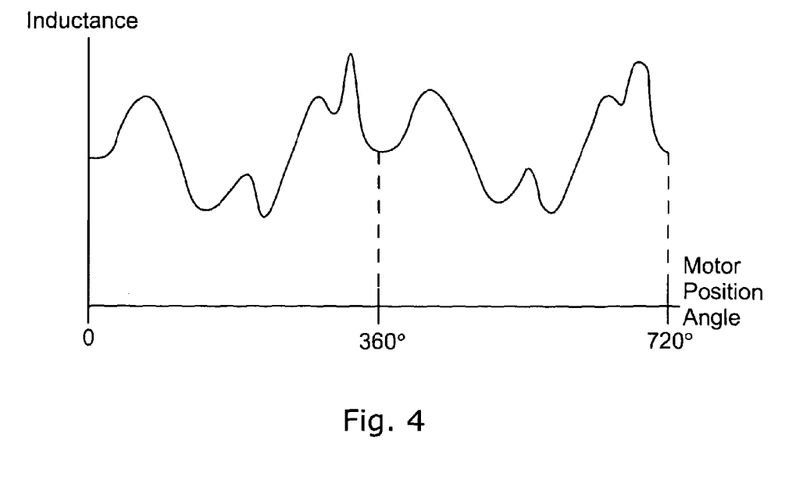
FIG. 4 shows how the motor inductance varies with motor position.
Figure 5:
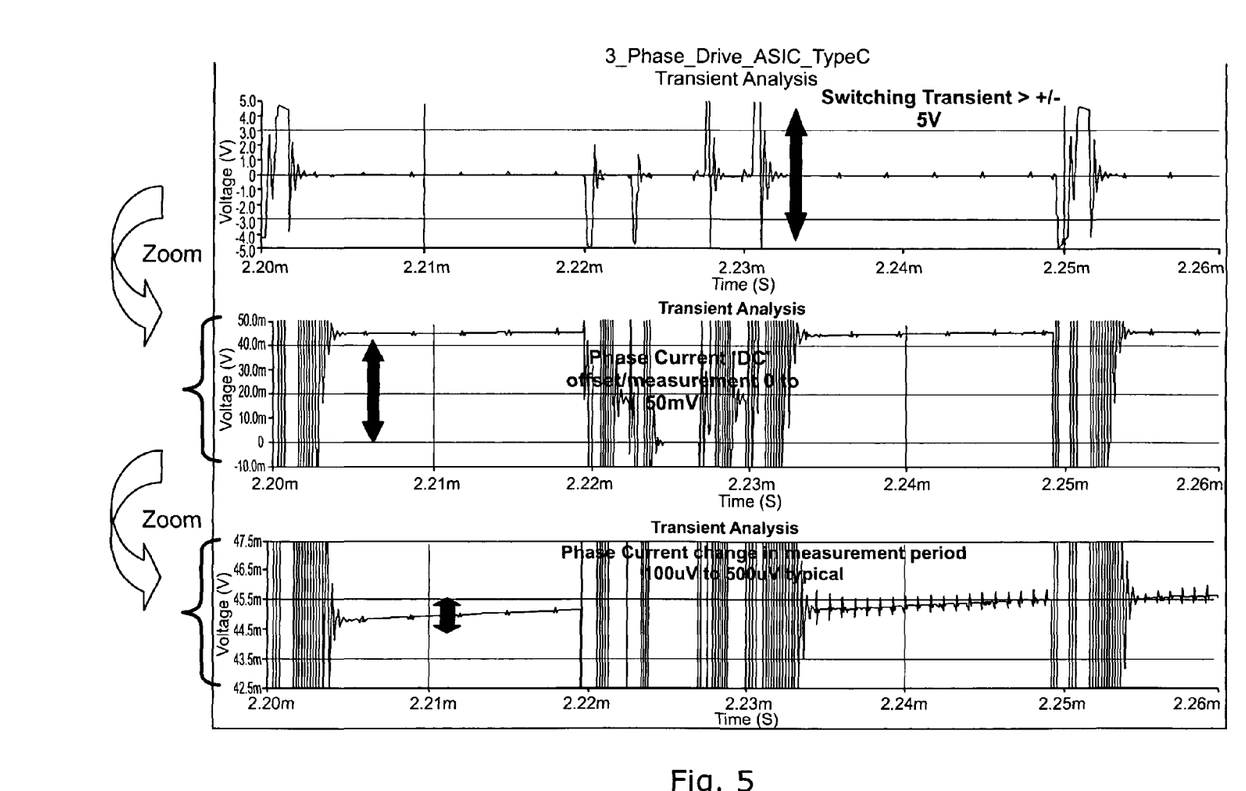
FIG. 5 illustrates typical current flowing in the PWM motor over time during operation of the motor.

It will be appreciated from FIG. 3 that the inductance of the rotor varies with electrical position because the air gap between the stator iron and rotor back iron varies with position, resulting in a variation of stator flux reluctance with rotor position. The variation of inductance for one of the three phases A, B, C is shown in FIG. 4 over two revolutions, clearly showing the periodic nature of the inductance value. The other phases will exhibit their own, unique, variations. The control unit 100 exploits this so that the estimate of position is derived from estimates of motor inductance which are themselves derived from measurements of the current in the motor during suitable test windows in the PWM pattern.

The absolute current flowing in the motor is also required by the control unit and this is obtained from a first current sensing means 200 comprising a current shunt resistor provided in series in the ground line 35 of the motor. The voltage dropped across this resistor is measured as this will vary with the current, and provided the value of the resistor is known the current can be determined quite readily. In order to measure the current in each of the windings the total current has to be sampled at precise instants within the PWM period where the voltage applied to each terminal of the winding (and hence the conduction state of a particular phase) is known.

In series with the current shunt resistor is a second current sensing means 300. This comprises a helical coil of wire wrapped around the ground line with one end of the coil passing back through the coil to form a Rogowski coil. As is known the output signal measured across the two ends of the coil provides a measure of the rate of change of current in the ground line around which it is wrapped. The current in this line will be indicative of the current generally flowing through the di/dt path of the motor. The two lines are fed to an amplifier 310. The second sensor 300 is used to measure the inductance of the phases. WO 2004/023639 again provides a teaching of how the di/dt signal can be used to determine inductance. In this example, the rate of change signal is fed to a comparison stage 70 which compares it with stored inductance information 40 to derive an estimated position signal 50.

Figure 6:
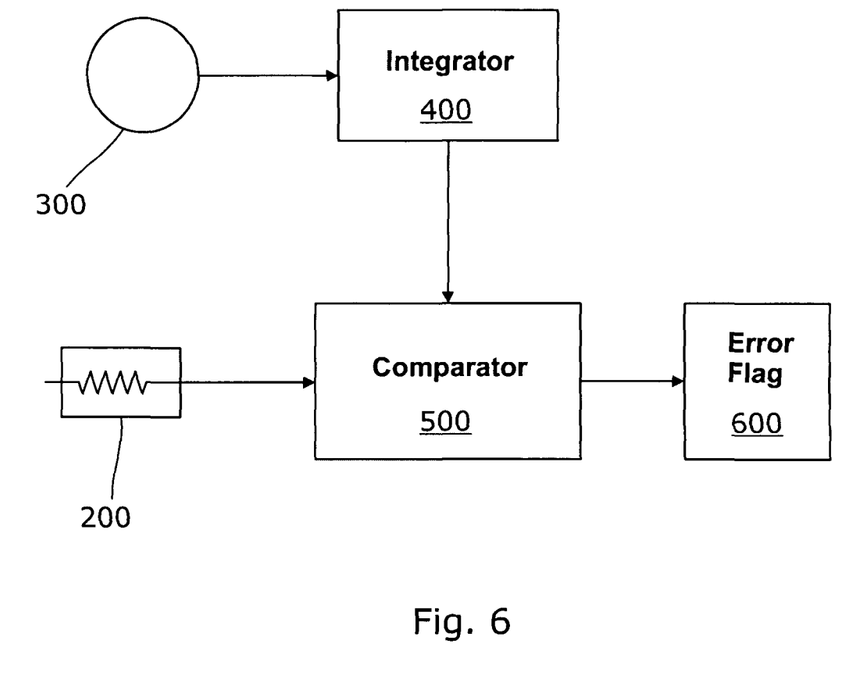
FIG. 6 is a schematic view of a subcircuit which can be used to flag potential errors in the measurement of the current in the motor.

An integrator 400 may also be provided which integrates the output of the Rogowski coil and provides as its output a signal indicative of the current flowing in the ground line. This is shown in FIG. 6 of the drawings. This derived current signal is compared with the signal output from the shunt resistor circuit using a comparator 500. If the current flow estimated from the integrator and the current shunt circuit differ the output of the comparator causes and error flag 600 to be raised.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A measurement circuit in a motor circuit arranged to generate signals for use in a motor control strategy for an electric motor, the motor having a plurality of phases, the measurement circuit comprising:
   a first current sensing means which produces an output signal indicative of a current flowing in a di/dt path connecting the phases of the motor to at least one of a ground line and a common positive supply voltage, wherein the first current sensing means comprises a current shunt resistor connected in series in the ground line and a circuit which produces an output signal indicative of a voltage dropped across the shunt resistor, and
   a second current sensing means which produces an output signal indicative of a rate of change of current flowing in the di/dt path, and in which the second current sensing means comprises a Rogowski coil.

2. A measurement circuit according to claim 1 in which the output signal of the first current sensing means and the output signal of the second sensing means are fed to respective inputs of a motor control circuit.

3. A measurement circuit according to claim 1 wherein the first current sensing means and the second current sensing means are arranged in series in the di/dt path.

4. A measurement circuit according to claim 1 which further includes an integrator which integrates the output signal from the Rogowski coil to provide a further signal indicative of the current flowing in the di/dt path, and a comparison means which is arranged to compare the further signal with the output signal from the first sensing means to flag an error in an event that the further signal and the signal output signal from the first sensing means differ by a significant amount.

5. A measurement circuit according to claim 1 wherein the Rogowski coil comprises a helical coil of conductive wire that encircles the di/dt path, with a first end of the coil being looped back through a centre of the coil to a second end of the coil, a signal of an output of the coil being indicative of a voltage measured across the ends of the Rogowski coil.

6. A measurement circuit in a motor circuit arranged to generate signals for use in a motor control strategy for an electric motor, the motor having a plurality of phases, the measurement circuit comprising:
   a first current sensing means which produces an output signal indicative of a current flowing in a di/dt path connecting the phases of the motor to at least one of a ground line and a common positive supply voltage, a second current sensing means which produces an output signal indicative of a rate of change of current flowing in the di/dt path, and in which the second current sensing means comprises a Rogowski coil, an integrator which integrates the output signal from the Rogowski coil to provide a further signal indicative of the current flowing in the di/dt path, and a comparison means which is arranged to compare the further signal with the output signal from the first sensing means to flag an error in an event that the further signal and the signal output signal from the first sensing means differ by a significant amount.

7. A measurement circuit according to claim 6 in which the output signal of the first current sensing means and the output signal of the second sensing means are fed to respective inputs of a motor control circuit.

8. A measurement circuit according to claim 6 wherein the first current sensing means comprises a current shunt resistor connected in series in the ground line and a circuit which produces an output signal indicative of a voltage dropped across the shunt resistor.

9. A measurement circuit according to claim 6 wherein the first current sensing means and the second current sensing means are arranged in series in the di/dt path.

10. A measurement circuit according to claim 6 wherein the Rogowski coil comprises a helical coil of conductive wire that encircles the di/dt path, with a first end of the coil being looped back through a centre of the coil to a second end of the coil, a signal of an output of the coil being indicative of a voltage measured across the ends of the Rogowski coil.

11. A measurement circuit in a motor circuit arranged to generate signals for use in a motor control strategy for an electric motor, the motor having a plurality of phases, the measurement circuit comprising:

a first current sensing means which produces an output signal indicative of a current flowing in a di/dt path connecting the phases of the motor to at least one of a ground line and a common positive supply voltage, and a second current sensing means which produces an output signal indicative of a rate of change of current flowing in the di/dt path, and in which the second current sensing means comprises a Rogowski coil, wherein the Rogowski coil comprises a helical coil of conductive wire that encircles the di/dt path, with a first end of the coil being looped back through a centre of the coil to a second end of the coil, a signal of an output of the coil being indicative of a voltage measured across the ends of the Rogowski coil.

12. A measurement circuit according to claim 11 in which the output signal of the first current sensing means and the output signal of the second sensing means are fed to respective inputs of a motor control circuit.

13. A measurement circuit according to claim 11 wherein the first current sensing means comprises a current shunt resistor connected in series in the ground line and a circuit which produces an output signal indicative of a voltage dropped across the shunt resistor.

14. A measurement circuit according to claim 11 wherein the first current sensing means and the second current sensing means are arranged in series in the di/dt path.

15. A measurement circuit according to claim 11 which further includes an integrator which integrates the output signal from the Rogowski coil to provide a further signal indicative of the current flowing in the di/dt path, and a comparison means which is arranged to compare the further signal with the output signal from the first sensing means to flag an error in an event that the further signal and the signal output signal from the first sensing means differ by a significant amount.

* * * * *